Nov. 25, 1958 C. A. CHRISTOFF 2,862,067

ADJUSTABLE MAGNETIC TRANSDUCER MOUNT

Filed March 30, 1956

INVENTOR,
Chris A. Christoff

BY

Fred N. Schwend

ATTORNEY.

United States Patent Office 2,862,067

Patented Nov. 25, 1958

2,862,067

ADJUSTABLE MAGNETIC TRANSDUCER MOUNT

Chris A. Christoff, San Gabriel, Calif., assignor to Clary Corporation, San Gabriel, Calif., a corporation of California Application March 30, 1956, Serial No. 575,011

4 Claims. (Cl. 179—100.2)

This invention relates to an adjustable mount for a magnetic transducer head such as is used to read, record and/or erase information in the form of magnetic spots on a traveling magnetic drum or the like.

In data processing or calculating equipment of an electronic nature, using a magnetic drum or tape as an information storage device, several magnetic transducer heads are quite often employed to transmit information to or from the record surface.

In cases where the density of information (magnetic spots or bits) is relatively high, it is desirable to adjust one or more of the transducer heads relative to others in order to obtain proper timing or synchronization or to change such timing, or word lengths, as desired.

Therefore, a principal object of the present invention is to provide a simple and inexpensive adjusting device for adjusting a magnetic transducer head along the length of a magnetic track cooperating with the head.

Another object is to provide an adjusting device for a transducing head which takes up a minimum amount of space.

Another object is to provide an adjusting device for a magnetic transducer head in which adjusting screws therefor are also effective to clamp the same in adjusted position.

The manner in which the above and other objects of the invention are accomplished will be readily understood on reference to the following specification when read in conjunction with the accompanying drawings, wherein.

Figure 1:
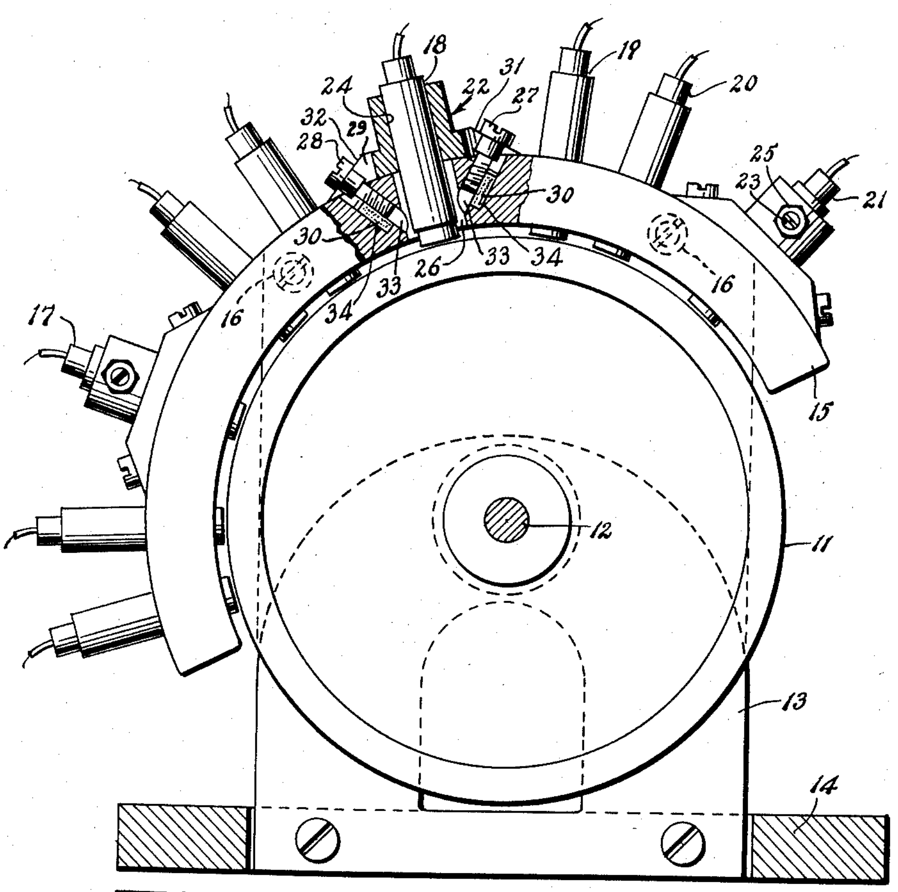
Fig. 1 is a side view, partly in section, of a magnetic drum and transducer head assembly embodying a preferred form of the present invention.

Referring particularly to Fig. 1, a magnetic drum 11 is suitably fixed to a drive shaft 12 rotatably mounted in bearings provided in brackets, one of which is shown at 13, located on opposite sides of the drum 1. The latter are suitably secured to a base member 14.

An arcuate head support 15 extends concentrically about a portion of the periphery of the drum 11 and is attached by screws 16 to the bracket 13.

Several transducer heads, i. e. 17, 18, 19, 20 and 21, are mounted on the support 15 for cooperation with certain ones of several tracks formed on the surface of the drum 11. These various heads may have different functions. For example, the head 18 may be a "read" head, the head 19 may be an "erase" head, and head 20 may be a "record" head. Certain only of the heads need be adjustable relative to others, and in the drawings only the heads 17, 18 and 21 are illustrated as adjustably mounted.

The nonadjustable heads, such as heads 19 and 20, are merely fitted in holes, i. e. 10, formed in the support 15 and are suitably secured therein in a manner not shown.

The adjustably mounted transducer heads, on the other hand, are each fitted in a centrally located hole 24 formed in an adjustable mount 22. Each head is suitably secured in proper position in its mount by a set screw, i. e. 23, threaded in the wall of the mount and held in place by a lock nut, i. e. 25.

Each adjustably mounted head, i. e. 18, extends through an oblong hole 26 formed in the support 15 to permit a limited adjustment of the head around the periphery of the support.

It will be noted that the undersurface of the mount 22 is arcuately formed to slideably fit against the periphery of the support.

Two combined clamp and adjusting screws 27 and 28 are located on the opposite sides of each adjustable mount. These screws extend through elongated slots 29 in the base of the mount, which slots are located on opposite sides of the transducer head and are threaded in holes 33 formed in the support. The sides of the slots preferably snugly embrace the screws to prevent lateral movement of the mount and head during an adjustment operation. A plastic friction element 30 is located in a hole 34 directly adjacent each screw 27 to frictionally lock the screw in place.

The screws 27 and 28 converge toward each other in the support 15 at an angle of 90°, each extending at an angle of 45° from the axis of the head, i. e. 18.

It will be noted that surfaces 31 and 32 on the mount extend perpendicular of the axes of respective ones of the screws 27 and 28 and are engaged by the heads of these screws, thereby forming camming surfaces against which the screw heads may operate in order to adjust the mount.

In order to adjust the mount 22 in a desired direction along the length of its respective track on the drum 11, one of the screws, depending upon the direction in which the adjustment is to be made, is backed off and the other is advanced thereby camming the mount and its transducer head around the surface of the support. Thereafter, the backed off screw is clamped down against the corresponding surface of the mount, leaving the same in proper adjusted and clamped position.

Figure 2:
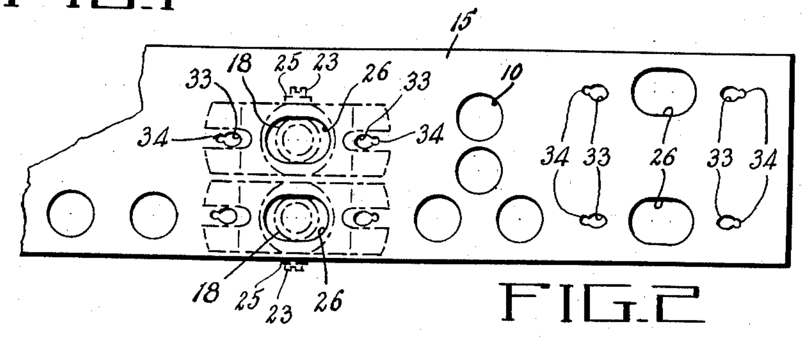
Fig. 2 is a developed plan view of part of the head support with the transducer heads removed.
Figure 3:
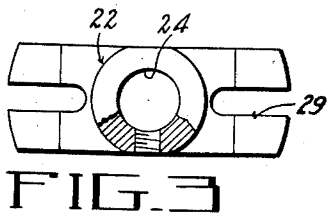
Fig. 3 is a plan view, partly in section, of one of the adjustable transducer head mounts.

As will be seen in Fig. 2, the base of each mount, i. e. 22, is relatively narrow, permitting two such mounts being placed relatively close to each other in a lateral direction. This permits relatively close spacing of the tracks on the drum in cases where adjacent adjustable heads must be aligned horizontally.

An important feature of the device is that both coarse and fine adjustment of the mount may be effected while the drum is running. For example, in initially adjusting the device or in radically changing the timing, both screws may be backed off and the mount moved back and forth by hand until the approximate position is found, as indicated by a suitable instrument such as an oscilloscope. Thereafter, the screws would be advanced and the previously described procedure followed in obtaining a fine adjustment. During such adjustment the screws, even though backed off, will guide the mount against lateral movement.

Although I have described my invention in detail in its preferred embodiment and therefore have utilized certain specific terms and languages herein, it is to be understood that the present disclosure is illustrative, rather than restrictive, and that changes and modifications may be resorted to without departing from the spirit or scope of the claims appended hereto. For example, the mating surfaces of each adjustable mount and the support may be formed flat instead of arcuate. Also, the angle of convergence of the screws may be changed from 90° if desired to obtain coarser or finer adjustment.

Having thus described the invention, what I desire to secure by United States Letters Patent is:

1. A device for adjusting a magnetic transducer head along the path of a traveling magnetic record member cooperable with said head, which comprises a support, a transducer head mount slideable on said support, said mount having a pair of elongated openings therein, threaded adjusting members extending through said openings and threadably secured in said support, said members engaging the sides of said openings and converging toward each other in said support, and heads on said members, a surface on the head of each of said members engaging a corresponding mating surface on said mount.

2. A device for adjusting a magnetic transducer head along the path of a traveling magnetic record member cooperable with said head, which comprises a support, a transducer mount slideable on said support, a pair of elongated openings in said mount, adjusting screws extending through said openings and threaded in said support, said screws engaging the sides of said openings and converging toward each other in said support, the heads of said screws being engageable with surfaces on said mount extending perpendicular to the axes of respective ones of said screws.

3. A device for adjusting a magnetic transducer head along the path of a traveling magnetic record member cooperable with said head, which comprises a support, a transducer mount slideable on said support, means for removably securing a transducer head in different positions on said mount, said mount having a pair of openings therein on opposite sides of said transducer head, adjusting screws extending through said openings and threaded in said support, said screws converging toward each other in said support, the heads of said screws being engageable with surfaces on said mount extending perpendicular to the axes of respective ones of said screws.

4. An adjusting device for a magnetic transducer head, past which a traveling record member is arranged to move, which comprises a support having an arcuate outer surface, a transducer mount slideable on said outer surface of said support, said mount and said support having coextensive openings therein for receiving a transducer head, the opening in said support being larger than the opening in said mount whereby to permit adjustment of said mount and said transducer head relative to said support, said mount having a pair of slots therein on opposite sides of said openings, adjusting screws extending through said slots and threaded in said support, said screws converging toward said opening in said support, and heads on said screws engageable with surfaces on said mount, said surfaces extending perpendicular to the axes of respective ones of said screws.

References Cited in the file of this patent

UNITED STATES PATENTS 2,574,707 Pettus ---------------- Nov. 13, 1951